(12) United States Patent
Ryu

(10) Patent No.: US 8,190,621 B2
(45) Date of Patent: May 29, 2012

(54) METHOD, SYSTEM, AND COMPUTER READABLE RECORDING MEDIUM FOR FILTERING OBSCENE CONTENTS

(75) Inventor: Jung-hee Ryu, Seoul (KR)

(73) Assignee: Olaworks, Inc., Seoul (KR)

( * ) Notice: Subject to any disclaimer, the term of this patent is extended or adjusted under 35 U.S.C. 154(b) by 221 days.

(21) Appl. No.: 12/669,636

(22) PCT Filed: Jul. 21, 2008

(86) PCT No.: PCT/KR2008/004255
§ 371 (c)(1),
(2), (4) Date: Jan. 19, 2010

(87) PCT Pub. No.: WO2009/014361
PCT Pub. Date: Jan. 29, 2009

(65) Prior Publication Data
US 2010/0211551 A1    Aug. 19, 2010

(30) Foreign Application Priority Data

Jul. 20, 2007    (KR) .................. 10-2007-0073128

(51) Int. Cl.
*G06F 7/00*    (2006.01)
(52) U.S. Cl. ........................ 707/754; 707/781
(58) Field of Classification Search .................. None
See application file for complete search history.

(56) References Cited

U.S. PATENT DOCUMENTS

| | | | |
|---|---|---|---|
| 6,675,162 B1 | 1/2004 | Russell-Falla et al. | |
| 7,130,850 B2 | 10/2006 | Russell-Falla et al. | |
| 7,383,282 B2 * | 6/2008 | Whitehead et al. | 707/700 |
| 7,742,521 B2 * | 6/2010 | Vitali et al. | 375/240.03 |
| 2005/0198692 A1 | 9/2005 | Zurko et al. | |
| 2006/0168006 A1 * | 7/2006 | Shannon et al. | 709/206 |
| 2007/0101353 A1 | 5/2007 | Jeong et al. | |

OTHER PUBLICATIONS

Wang et al., "SIMPLIcity: Semantics—Sensitive Integrated Matching for Picture Libraries", Sep. 2001, IEEE Transactions on Pattern Analysis and Machine Intelligence, vol. 23, 947-963.*

* cited by examiner

*Primary Examiner* — Hung Q Pham
(74) *Attorney, Agent, or Firm* — Husch Blackwell LLP

(57) ABSTRACT

The present invention relates to a method and a system for filtering the harmful content (s) which includes a filter group for providing an optimized filter for each category; a matching engine for monitoring harmfulness of the content by matching it with existing lewd contents recorded in a pornographic content database and/or advertising contents recorded in an advertising content database; an interface part which provides a user with information on a degree of similarity between the inputted content and the harmful contents recorded in the above-mentioned database which is calculated through the matching process in order to increase the filtering accuracy; and information on a degree of harmfulness of the content calculated in the filter group; and information on a user who created or distributed the content. Accordingly, it is possible to filter adult contents or advertising contents with much higher accuracy by three harmful content blocking steps.

17 Claims, 4 Drawing Sheets

[Fig. 1]
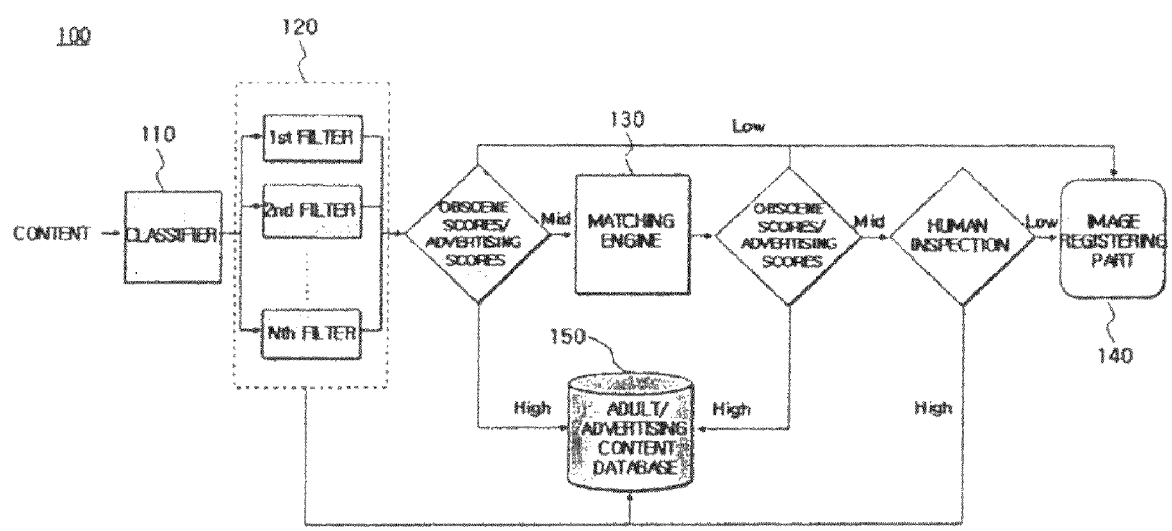

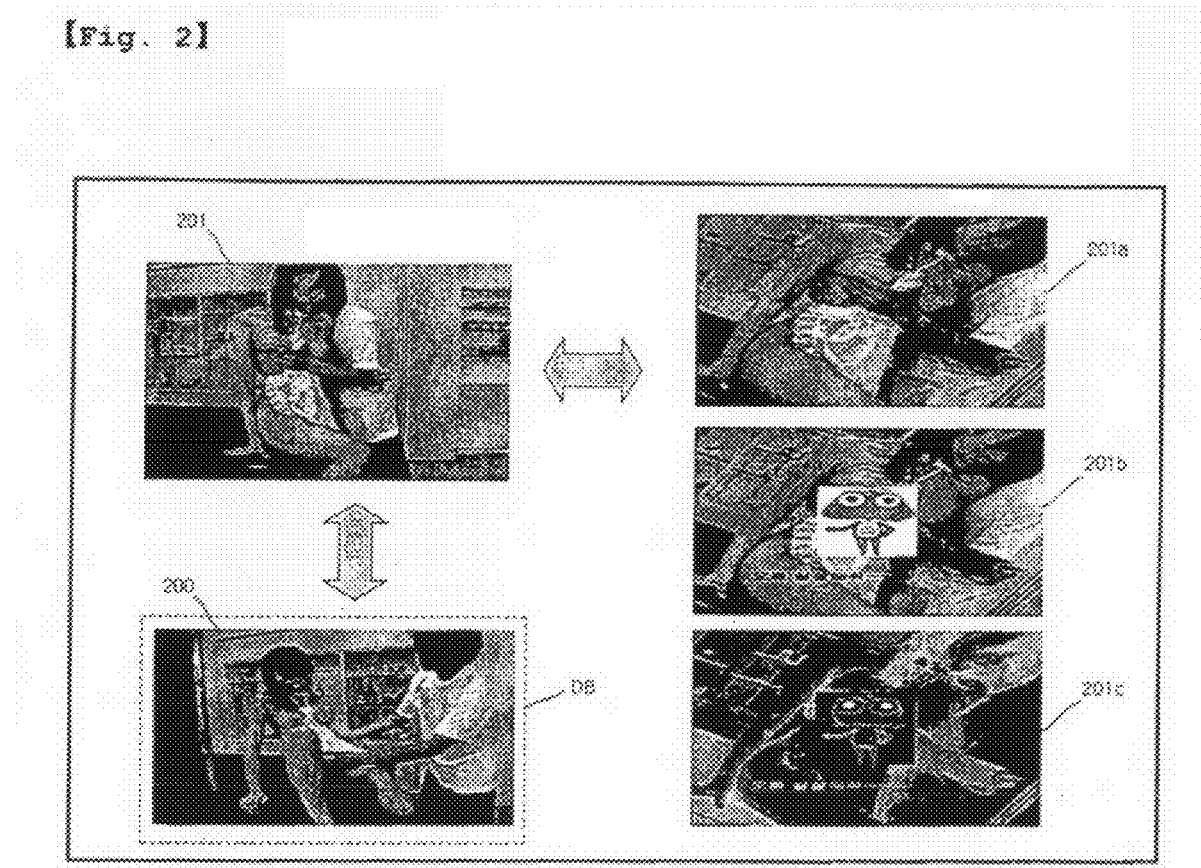

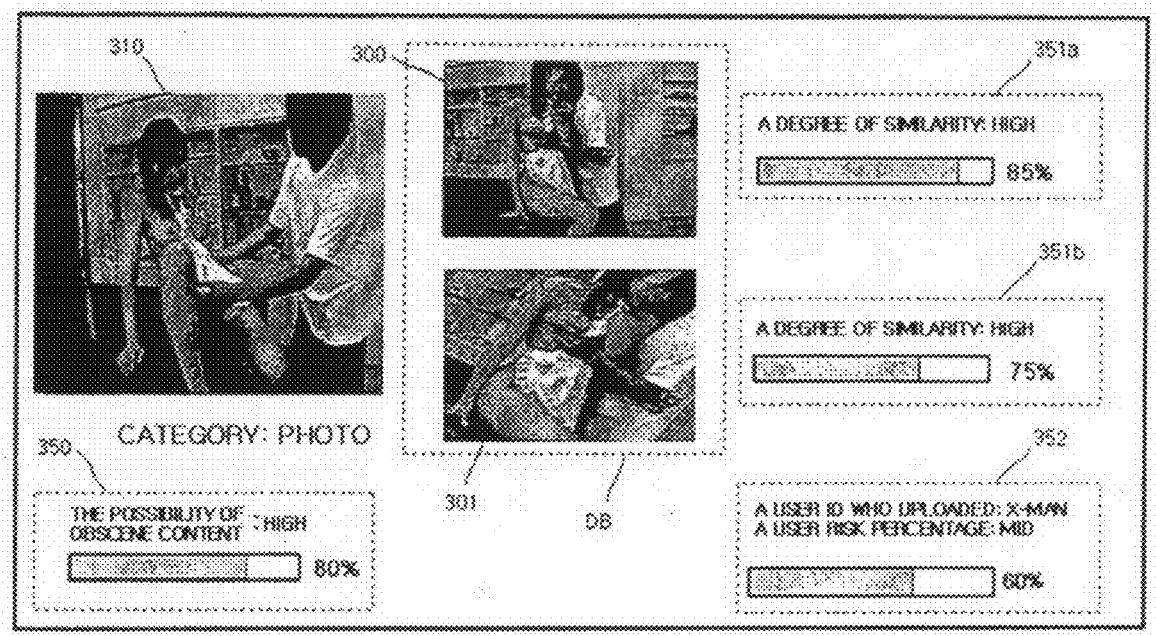

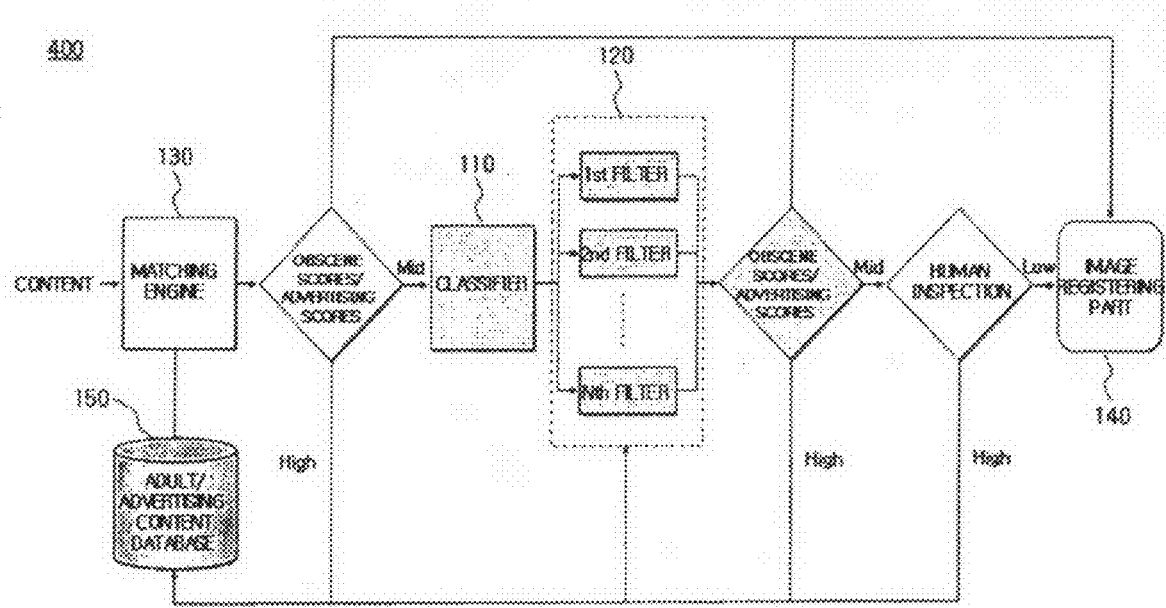
[Fig. 4]

METHOD, SYSTEM, AND COMPUTER READABLE RECORDING MEDIUM FOR FILTERING OBSCENE CONTENTS

CROSS REFERENCE TO RELATED APPLICATIONS

This application is a U.S. National Phase Application of International Application PCT Application No. PCT/KR2008/004255 filed on Jul. 21, 2008, which claims the benefit of priority from Korean Patent Application No. 10-2007-0073128 filed on Jul. 20, 2007. The disclosures of International Application PCT Application No. PCT/KR2008/004255 and Korean Patent Application No. 10-2007-0073128 are incorporated herein by reference.

TECHNICAL FIELD

The present invention relates to a method and a system for filtering various types of harmful contents which may be illegally distributable through communicating means including the Internet; and more particularly to the method and the system for filtering the harmful content(s) which includes a filter group for providing an optimized filter for each category; a matching engine for monitoring harmfulness of the content by matching it with existing lewd contents recorded in a pornographic content database and/or advertising contents recorded in an advertising content database; an interface part which provides a user with information on a degree of similarity between the inputted content and the harmful contents recorded in the above-mentioned database which is calculated through the matching process in order to increase the filtering accuracy; and information on a degree of harmfulness of the content calculated in the filter group; and information on a user who created or distributed the content.

BACKGROUND ART

Recently, as the Internet is more widely used, the amount of contents supplied by traditional content distributors including Internet portals or Internet service providers is on increase. In addition, Internet use sharply increases in an active form in which users themselves create and provide contents rather than a passive form in which getting information from such traditional content distributors is only focused.

In other words, the contents including web documents, news articles, images, videos and media information were mainly provided only by online portals etc. in the past but recently such contents are actively produced and distributed by individual users. By the increase in the production and distribution of user created content (UCC) and web hosting services such as blogs or websites capable of providing several functions to enable more users to conveniently create content, the situation is deepening.

Such user created content is created with the procedure of transmitting files such as images or videos recorded in a terminal of a user to the servers of blog or webpage service providers (shortly, service servers) or the procedure of suggesting a link to the already existing files on a network at the same time with the procedure which allows the user to prepare data in a text form.

The exchange of various types of contents through the Internet enables users to share information, but some users may share obscene content such as adult videos, adult photos and adult comics and illegal ads through the Internet which results in bad spillover effects even to many fair users.

To block such an obscene content, a variety of methods have been proposed from the past, which, for example, include a scheme for blocking an Internet search engine from a lewd content in order to prevent the users from accessing such a content; a scheme for deleting an obscene content by a service server when such a content is uploaded and reported by a user; or a scheme for checking how much percentage the skin color is occupied in an image or a video file and blocking the obscene content when the percentage is high.

DISCLOSURE

Technical Problem

However, the conventional methods have the following problems: that it cannot cover a variety of examples of query for retrieving the lewd content; that harmless content, which may be retrieved by using a query similar to a certain query for retrieving an obscene content, may not be retrieved if the certain query is blocked; that it may fail to block a content which was determined as lewd content but changed through a image process such as rotating, cutting, resizing or color changing by a user; and that it is difficult to widely cover a variety of harmful contents including adult videos, adult pictures, adult comics and illegal ads.

Further, the method for blocking the obscene content by checking how much percentage the skin color is occupied in an image or a video file has also a problem as follows: If a face of a person is taken a picture of with a close-up shot, even though it is not an obscene content, it may be classified as the lewd content only for the reason that the percentage of the skin color exceeds, e.g., 90 percent. In addition, it has another problem in that colors of clothes may be confused with the skin colors because there are many different skin colors by races and individuals, thereby failing to enhance the accuracy of filtering the obscene content.

Technical Solution

It is, therefore, an object of the present invention to provide a method and a system for filtering a harmful content, i.e., an obscene content and/or an advertising content, that is realized by including a filter group which provides an optimized filter according to a category of a user-inputted content in order to calculate a degree of harmfulness; a matching engine which determines whether or not the content is harmful by matching it with existing lewd contents and/or advertising contents recorded in a pornographic content database and/or an advertising content database; and a user interface providing unit which provides information on a degree of similarity between contents calculated at the matching engine, information on the degree of harmfulness of the contents calculated at the filter group, and information on users who created or distributed the contents.

Advantageous Effect

In accordance with the present invention, the system and method have the following effects: (i) it is possible to filter adult contents or advertising contents with much higher accuracy by so called three harmful content blocking steps; and (ii) as the number of contents recorded in a pornographic content database and/or an advertising content database is increasing, it is possible to reduce bad effect caused by the harmful contents and improve the confidence in filtering system.

DESCRIPTION OF DRAWINGS

The above objects and features the present invention will become more apparent from the following description of the preferred embodiments given in conjunction with the accompanying drawings, in which:

FIG. 1 is a block diagram that shows a system for filtering an obscene content in accordance with an example embodiment of the present invention.

FIG. 2 is an exemplary diagram showing a matching method for comparing an inputted content with existing obscene ones recorded in a database to determine whether the content is obscene or not in accordance with an example embodiment of the present invention.

FIG. 3 is an exemplary diagram illustrating a user interface capable of helping to determine manually if such a content is not easy to determine automatically whether it is obscene or not in accordance with an example embodiment the present invention.

FIG. 4 is a block diagram showing a system for filtering an obscene content in accordance with another example embodiment of the present invention.

BEST MODE

The configurations of the present invention for accomplishing the above objects of the present invention are as follows.

In one aspect of the present invention, there is provided a method of blocking a newly inputted harmful content by referring to a database in which harmful contents are recorded, including the steps of: (a) classifying the content into a certain category among n categories; (b) deciding a degree of harmfulness of the content which represents the possibility of the content to be determined as harmful content by extracting a text from the content and analyzing the area of a person or a thing by using a filter assigned to the certain category; (c) recording the content in the database if it is decided to be a high degree of harmfulness, uploading the content as harmless one if it is decided to be a low degree of harmfulness, and matching the content with the existing harmful contents in the database to calculate a degree of similarity therebetween if it is difficult to judge the degree of harmfulness; (d) recording the content in the database if it is decided to be a high degree of similarity, uploading the content as harmless one if it is decided to be a low degree of similarity, and displaying at least one of information on the degree of harmfulness, the degree of similarity and a user who created or distributed the inputted content if it is difficult to judge the degree of similarity; and (e) recording the content in the database if it is decided as harmful by referring to the information and uploading the content as harmless one if it is decided as harmless by referring to the information.

In another aspect of the present invention, there is provided a method of blocking newly inputted harmful content by referring to a database in which harmful contents are recorded, including the steps of: (a) matching the content with the existing harmful contents in the database to calculate a degree of similarity therebetween; (b) recording the content in the database if it is decided to be a high degree of similarity, uploading the content as harmless one if it is decided to be a low degree of similarity, and classifying the content into a certain category of n categories if it is difficult to judge the degree of similarity; (c) deciding a degree of harmfulness of the content which represents the possibility of the content to be determined as harmful content by extracting a text from the content and analyzing the area of a person or a thing by using a filter assigned to the certain category; (d) recording the content in the database if it is decided to be a high degree of harmfulness, uploading the content as harmless one if it is decided to be a low degree of harmfulness, and displaying at least one of information on the degree of harmfulness, the degree of similarity and a user who created or distributed the inputted content if it is difficult to judge the degree of harmfulness; and (e) recording the content in the database if it is decided as harmful by referring to the information and uploading the content as harmless one if it is decided as harmless by referring to the information.

In still another aspect of the present invention, there is provided a system for blocking newly inputted harmful content including: a database in which contents determined as harmful are recorded; an image registering part in which contents determined as harmless are recorded; a classifier which classifies the content into a certain category among n categories; and a filtering part which calculates a degree of harmfulness of the content which represents the possibility of the content to be determined as harmful content by extracting a text from the content and analyzing the area of a person or a thing by using a filter assigned to the certain category; and a matching engine which calculates a degree of similarity between the inputted content and the harmful contents in the database, wherein the filtering part transmits the content to the database if the content is determined to have a high degree of harmfulness, transmits to the image registering part if it is decided to have a low degree of harmfulness, and transmits to the matching engine if it is difficult to determine the degree of harmfulness, and wherein the matching engine transmits the content to the database if the content is determined to have a high degree of similarity, transmits to the image registering part if it is decided to have a low degree of similarity, and displays at least one of information on the degree of harmfulness, the degree of similarity and users creating or distributing the content on a terminal to help a user to determine whether the content is harmful or not if it is difficult to determine the degree of similarity.

MODE FOR INVENTION

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different from one another, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled.

The embodiments of the present invention are explained as follows by referring to the attached drawings:

FIG. 1 is a block diagram that shows a system 100 for filtering an obscene content in accordance with an example embodiment of the present invention.

By reference of FIG. 1, the system 100 includes a classifier 110, a filter group 120, a matching engine 130, an image registering part 140, an adult/advertising content database 150 etc.

Specifically, when a content is inputted into the system 100 by a user, the classifier 110 plays a role in deciding which category the content is classified into and assorting it by the decided category.

In accordance with the present invention, the classifier 110 may classify the inputted content into a variety of categories. For example, the classifier 110 may classify it into the category of photo or comic, or the category of color or black-and-white. It also may classify it into the category of color photo, black-and-white photo, color comic or black-and-white comic. In case of a content included in the comic category, it may be assorted into a variety of subcategories depending on the style of comic, e.g., a hatching and a gradation.

It is clearly said that the above-mentioned categories classified by the classifier 110 are exemplary and not limited thereto.

For example, assuming that the classifier 110 classifies the content into one of n categories among which at least the photo and the comic categories are included, the algorithm for classifying into the photo and the comic categories may be implemented by the adoption of "SIMPLIcity: Semantics-Sensitive Integrated Matching for Picture Libraries (IEEE Transactions on Pattern Analysis and Machine Intelligence, vol. 23. no. 9. pp. 947-963, 2001)," an article released by James Z. Wang, Jia Li and Gio Wiederhold in the IEEE 2001 Forum.

Specifically, according to the article, it introduces a technology which determines whether the content is a photo or a graphic image (e.g., an icon etc.) and the technology may be adopted in the classifier 110. Accordingly, the classifier 110 may determine whether the inputted content is a photo or a comic by compounding features such as a color, an entropy and a texture.

In other words, in accordance with the present invention, after extracting three characteristics from the inputted content, this method can (i) analyze the error by quantizing the inputted image and classify the inputted content by using the characteristic that a comic has a small error and a photo has a large error; (ii) analyze a global entropy value and classify the inputted content by using the characteristic that a comic has a high global entropy value and a photo has a low value; or (iii) analyze a local entropy value and classify the inputted content by using the characteristic that a comic has a high global entropy value and a photo has a low value. In the end, the content may be decided as a photo or a comic by combining the above-mentioned three characteristics through the weighted sum with the use of a singular vector machine. Since the article explains the concept of the global entropy, the local entropy etc., the description thereabout will be omitted.

As another example, assuming that the classifier 110 classifies the contents into one of n categories among which at least the color and the black-and-white categories are included, the method can determine whether the inputted content is a color image or a black-and-white one by converting the content into an appropriate color space (e.g., a LUV color space) and then referring to the distribution thereof on the color space. In short, it may classify the content into the category of color or black-and-white by using the unique characteristic that when the distribution is wide in the color space, it is classified as a color image, and when narrow, it is a black-and-white image.

As still another example, assuming that the classifier 110 classifies the contents into one of n categories among which at least the comic category with and without hatching and with and without gradation are included, an algorithm may be applied as follows: In other words, if, after the Fourier transform is applied, a cycle is repeated in a certain area of frequency domain, it can be determined to have a hatch, and if, after the content is converted into an appropriate color space (e.g., a LUV color space), the distribution in the color space is continuous, it can be classified into the category with gradation.

The filter group 120 may include optimal filters by each category for determining the degree of harmfulness (i.e., a degree of obscenity and/or a degree of advertisement) of the content which was classified into one of the categories by the classifier 110.

By reference of FIG. 1, the filter group 120 includes the first, the second, . . . , n-th filter and each of the categories may correspond to at least one filter.

For instance, if the content is classified into the photo category by the classifier 110, at least one filter which blocks the harmful content in the photo category (by calculating the degree of harmfulness of the content) (hereinafter referred to as "the first filter") may be included in the filter group 120. In addition, if the content is classified into the comic category by the classifier 110, at least one filter which blocks the harmful content in the comic category (referred to as "the second filter") may be included in the filter group 120.

The first filter is used to determine the harmfulness of the content classified as the photo category, wherein the harmful content includes obscene content and advertising content.

Specifically, in consideration of how the method of filtering harmful content is implemented by the first filter, the method for determining whether the content is, e.g., an adult photo or not on the basis of the characteristics such as a skin color and a shape is disclosed in "Statistical Color Models with Application to Skin Detection (M. J. Jones and J. M. Rehg, Int. J. of Computer Vision, 46(1): 81-96)," an article released in January 2002. According to the article, a content is possible to be determined as an adult content if, after dividing the content into skin area and non-skin area, the percentage of the skin area is high. In case a face is taken a picture of with close-up shot, since the percentage of the skin area is high, it may be wrongly determined as an obscene content. To make up for the defect, the present invention introduces an idea: after detecting the face included in the photo, if the percentage of the skin area becomes high due to the area of the face, the method will reduce the possibility of the content being determined as a lewd one. Further, since a moving picture or a video can be seen as a set of photos, it can also be blocked in a similar way to a photo-filtering method. The detailed explanation thereabout will be omitted.

Next to this, considering how the method of filtering advertising content is implemented by the first filter, the first filter extracts a text by using a camera-based optical character reader mentioned in an article released in 2003 titled "Progress in Camera-Based Document Image Analysis, IEEE ICDAR 2003." It determines whether the information related to advertisement such as a company name, a telephone number and an email is included in the extracted text or not. The telephone number may have its format such as "060", and even email or company name may be recognized using a separately built database.

Furthermore, because URL includes a specific form such as @ or dot, the first filter may have a function to filter it if a URL which is related to a website of pornography, gambling, money-earning, gifting or lottery is included in the extracted text. For instance, the first filter may detect if a undesirable keyword (such as gamble) is included in the URL in order to build a blacklist of URLs (in the fields of pornography, money-earning, gambling, gifting, lottery etc.) in a form of database.

In addition, it is also possible to determine if the content creates or offers a monetary transaction by promoting or displaying products or if it is related to illegal pyramid sales.

The above-mentioned processes can be implemented not only by a method of accessing the URL, taking sources and obtaining the keywords of the sources but also by a method of extracting meaningful text strings from the text data in the content by utilizing an existing method of linguistics such as a natural language processing and/or a morphological analysis, processing.

Meanwhile, the second filter determines the harmfulness regarding the content determined to be included in the comic category by the classifier 110. To implement this, it extracts text such as the dialogues of characters in a comic by using the camera-based OCR and detects pornographic keywords by using the existing linguistic methods such as natural language processing and/or morphological analysis processing. If a pornographic keyword is detected, the content will be decided as an adult comic and if an advertising keyword is found, it will be determined as a comic for advertising.

Besides, it is sure that the third, the fourth, the fifth filter etc. can be implemented by optimal filters for filtering harmful content by each of the categories. including a category of color, black-and-white, comic with hatching etc. For the reason that explanation on them is partly redundant with that on the first and the second filters, we omit the detailed explanation thereabout.

To determine obscenity and/or advertising, each of the filters optimally allotted to each category of the content, including the first filter and the second one, may score the degree of harmfulness of the content from 0 to 100. In case of the content determined as obscene with high scores (i.e., the harmful level: high), the content is transmitted and recorded in the adult/advertising content database 150. For reference, such scores may be separately calculated by dividing obscene scores and advertising scores or may be managed by totaling the obscene scores and the advertising scores.

The adult/advertising content database 150 may be embodied so as to record the content determined as obscene and include information on a user who created or distributed such a content in order to increase correctness and efficiency of filtering. As well, the adult/advertising content database 150 may manage information on the adult and the advertising contents together in a physically unified database or separately in more than two physically separated databases.

The database in the present invention includes not only the narrow meaning of database but also the wide meaning thereof including data records based on a file system and even a simple set of logs if retrieved to extract data. The adult/advertising content database 150 may be included in the system 100 or may exist in a remote memory communicable with the system 100.

In case of the content which was determined as nonobscene with low scores by a certain filter which is optimally allotted among n filters including the first and the second filters as shown above (i.e., the harmful level: low), the content is transmitted to the image registering part 140 and officially registered as a nonobscene one, thereby enabling users to access such a content. The image registering part 140 may select and record the content determined as harmless by the system 100 and information on users who created or distributed the content and perform a role in displaying the recorded contents later at the request of a user.

Additionally, the image registering part 140 may record unharmful content by each category by using the recognition technology of a person or a thing included in the content and/or a text extracted by the camera-based OCR from the filter group 120. For example, the information on the text detected by the camera-based OCR may be used to record the content by categories such as history, religion, art, philosophy, science and medicine or recognition technology on a person or a thing included in the content may be utilized to record the content by categories such as doll, robot, book, Sanguozhi, electronic appliance, PMP and MP3.

If it is obscure to determine the harmfulness even by the scores calculated by a certain filter optimally allotted to a certain category (i.e., the harmful level: mid), the content is transmitted to the matching engine 130.

It is desirable that the matching engine 130 is embodied so as to have a single process regardless of types of content but it should be noted that it can be implemented with a processor per category. The detailed explanation about the function of the matching engine 130 will be made by reference of FIG. 2. It is sure that FIG. 2 shows adult content exemplarily but the same concept may also be applied even to advertising content.

FIG. 2 is an exemplary diagram presenting the processes of the matching engine 130 for calculating similarity between a content and harmful contents recorded in the adult/advertising content database 150 to determine whether the content is harmful or not in accordance with the present invention.

The matching engine 130 calculates similarity through the comparison of a content determined to have a harmful level of "mid" in the filter group 120 with the existing harmful contents in the adult/advertising content database 150. According to the comparison, IDs of top n content which is considered as the most n similar contents among all the contents recorded in the adult/advertising content database 150 and similarity scores between both contents (e.g., from 0 to 100 in a form of integer) may be calculated.

The matching engine 130 performs a so-called "exact matching" if both contents are identical and a so-called "approximate matching" if the content is varied (by cutting, rotating, resizing, overlaying, color modification etc.). This will be specifically explained below.

By reference of FIG. 2, the content 200 is an example of the existing adult content which was already decided as a harmful content and recorded in the adult/advertising content database 150, and the content 201 is an instance of the content which was judged to have the harmful level of "mid" in the filter group 120 and transmitted to the matching engine 130. The matching engine 130 compares the content 200 with the content 201.

If there is only the content 200 which is not same as but similar to the content 201 among the adult contents recorded in the adult/advertising content database 150, the matching engine 130 calculates similarity scores between the content 200 and the content 201 by the approximate matching scheme, where, if it gets high similarity scores (if it is judged to have the high harmful level), the content 201 would be newly recorded in the adult/advertising content database 150 and if it gets low similarity scores (it is determined to have the low harmful level), the content 201 would be registered as the content appropriate to the image registering part 140. If it is not clearly determined by the matching engine 130, it would move to the step of human inspection, which will be described below by reference of FIG. 3.

In the meantime, just like the content 201 newly recorded in the adult/advertising content database 150 due to high similarity scores, when harmful contents are more accumulated in the adult/advertising content database 150, they can be used as a more powerful tool for filtering any new obscene content.

As another example, if a user intends to upload a variation of the content 201 which was judged as obscene through the procedure (for example, if a user wants to upload a content 201A made by cutting, rotating or enlarging the content 201, a content 201B overlaying the content 201A by a random image, a content 201C changing the color of the content 201B etc., not only the content 200 which was used to filter the content 201 but also the content 201 which is newly recorded as a obscene content could be used to filter the contents 201A, 201B and 201C. Moreover, after the contents 201A, 201B and 201C are recorded in the adult/advertising content database 150, more powerful filtering procedure may be achieved.

FIG. 3 is an exemplary diagram that shows the user interface to help human inspection if it is difficult to determine whether it is harmful or not even by the filter group 120 and the matching engine 130 in accordance with the present invention. For reference, FIG. 3 exemplarily shows an adult content but the same concept can be applied even to an advertising content.

By referring to FIG. 3, a content 310 is the subject of human inspection because it is difficult to judge whether it is harmful or not even by the filter group 120 and the matching engine 130, and a content 300 and a content 301 are harmful contents recorded in the adult/advertising content database 150. To help a user to perform the human inspection, adult content scores 350 calculated by the filter group 120 and similarity scores 351A and 351B calculated by the matching engine 130 are displayed in addition to a user risk percentage 352, resulting in the human inspection with high correctness.

Specifically, the similarity scores 351A show the scores of similarity between the target content 310 and the content 300 and the similarity scores 351B present the scores of similarity between the content 310 and the content 301.

Moreover, the user risk percentage 352 presents information on whether the user who uploaded the content 310 is included in the blacklist by analyzing how many obscene contents the user has created or distributed.

The user can determine the harmfulness by reference of the information and if the harmful level is determined as high, the content 310 is recorded in the adult/advertising content database 150 and if the harmful level is decided as low, the content 310 is recorded in an image registering part 140.

The content determined as harmful may be used to improve the performance of the filter through the feedback to the filter group 120. Further, if more harmful contents are recorded in the adult/advertising content database, the performance of the matching engine 130 could be more improved.

The embodiment by reference of FIG. 2 and FIG. 3 was explained regarding the adult content but it would be naturally applied even to the advertising content as follows:

With a simple look at this, when it is sure that a text extracted from the content by the camera-based OCR in the filter group 120 is detected and analyzed by the natural language processing and then an advertising keyword is recognized, the filter group 120 can record the content as advertising one in the adult/advertising content database 150, and when it is difficult to judge whether the content is advertising one or not by the filter group 120, the matching engine 130 can perform a role in comparing the content with the existing advertising contents included in the adult/advertising content database 150. Further, when it is difficult to determine whether the content is advertising one or not even by the matching engine 130, it is possible to provide user interfaces which display the advertisement scores 350 calculated by the filter group 120, the similarity scores 351A and 351B by the matching engine 130 and the user risk percentage 352.

Herein, the similarity scores 351A and 351B will show similarity with existing advertising contents and the user risk percentage 352 will provide the information on how often the user has uploaded advertising contents. We will omit the detailed explanation about filtering process of the advertising content because many aspects thereof are similar to those of the adult content.

Meanwhile, the system 100 in FIG. 1 may be adopted if the performance of the filter group 120 is reliable or if the contents recorded in the adult/advertising content database 150 to be used in the matching engine 130 are not sufficiently secured.

FIG. 4 is a block diagram that shows a system 400 for blocking the harmful contents in accordance with another example embodiment of the present invention.

The most outstanding difference between the system 400 of FIG. 4 and the system 100 of FIG. 1 is that the filter group 120 goes after the matching engine 130 in the dataflow diagram.

In other words, a content inputted to the system 400 is determined whether the content is adult one or advertising one through the comparison with the existing contents recorded in the adult/advertising content database 150 by the matching engine 130, and if the content is judged as a high harmful level, it will be recorded in the adult/advertising content database 150 and if it is considered as a low harmful level, it will be recorded in the image registering part 140. If the content is considered as a mid harmful level, the content is inputted to the classifier 110.

The content inputted to the classifier 110 is classified as a variety of categories such as the categories of photo, comic and black-and-white etc., and then delivered to the filter group 120 including filters such as the first, the second, . . . , the n-th filters which determines whether the content corresponds to adult one or advertising one. Herein, because the detailed explanation on the following steps is same as that of FIG. 1, we will omit it.

Illustrated in FIG. 4, the system 400 may be used in case the performance of the filter group 120 fails to be reached at the reliable level unlike the system 100 of FIG. 1 or in case there are lots of contents recorded in the adult/advertising content database 150 to be used by the matching engine 130.

The embodiments of the present invention can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method of blocking a newly inputted harmful content by referring to a database recording harmful content items, the method comprising the steps of:
   (a) classifying, by a processor programmed to operate as a classifier, a new content into particular categories among a plurality of categories, the new content including information for presenting to end users over a network, wherein the new content is classified into a first category and a second category, wherein the first category is a category of photos or a category of comics, and wherein the second category is a category of color or a category of black-and-white;
   (b) determining, by a filtering part, a degree of harmfulness of the classified new content by extracting text data from the classified new content and by analyzing an image area of a person or an object with a first optimal filter and a second optimal filter associated with said first category and second category respectively, the degree of harmfulness representing a possibility of said classified new content to be determined as a harmful content, wherein the first optimal filter and the second optimal filter are optimal for determining the degree of harmfulness of the classified new content;
   (c) recording, by the filtering part, the classified new content in the database recording harmful content items if said degree of harmfulness of said classified new content is determined to be higher than a first upper threshold, or uploading, by an image registering part, the classified new content if said degree of harmfulness of said classified new content is determined to be lower than a first lower threshold, or comparing, by a matching engine, the classified new content with said harmful content items recorded in the database to calculate a degree of similarity between the classified new content and said harmful content items if said degree of harmfulness of said classified new content is determined to be between the first upper threshold and the first lower threshold;
   (d) recording, by the matching engine, the classified new content in the database if said degree of similarity is determined to be higher than a second upper threshold, or uploading, by the image registering part, the classified new content if said degree of similarity is determined to be lower than a second lower threshold, or displaying, by a displaying part, information relating to at least one of: the degree of harmfulness, the degree of similarity, and a user who created or distributed the new content if said degree of similarity is determined to be between the second upper threshold and the second lower threshold; and
   (e) recording the classified new content in the database or uploading the classified new content in response to user determination based on the displayed information.

2. The method of claim 1, wherein the step of classifying includes a step of determining whether the new content is classified as said category of photos or category of comics by making up features of the new content including a color, an entropy and a texture.

3. The method of claim 2, wherein the color, the entropy and the texture is made up with a weighted sum by using a singular vector machine.

4. The method of claim 3, wherein the step of classifying includes a step of extracting the color, the entropy and the texture from the new content and analyzing errors generated when images of the new content are quantized and then determining the new content as being in said category of comic if the errors are small and as being in said category of photo if the errors are large.

5. The method of claim 3, wherein the step of classifying includes a step of extracting the color, the entropy and the texture from the new content and analyzing a global entropy value to determine the new content as being in said category of comic if the global entropy value is high and as being in said category of photo if the global entropy value is low.

6. The method of claim 3, wherein the step of classifying includes a step of extracting the color, the entropy and the texture from the new content and analyzing a local entropy value to determine the new content as being in said category of comic if the local entropy value is high and as being in the category of photo if the local entropy value is low.

7. The method of claim 1, wherein the new content is converted to a certain color space and then new the content is determined whether it belongs to the category of color or the category of black-and-white by using distribution of the certain color space.

8. The method of claim 1, wherein the step of classifying includes a step of classifying the content into the category of comics with hatching or the category of comics without hatching among said plurality of categories.

9. The method of claim 1, wherein the step of classifying includes a step of classifying the content into the category of comics with gradation or the category of comics without gradation among said plurality of categories.

10. The method of claim 9, wherein the new content is converted to a certain color space and then the new content is determined whether it belongs to the category of comics with gradation or the category of comics without gradation by using distribution of the certain color space.

11. A method of blocking newly inputted harmful content by referring to a database recording harmful content items, the method comprising the steps of:
   (a) comparing, by a matching engine executed on a processor, a new content with harmful content items recorded in a database to calculate a degree of similarity between the new content and said harmful content items, the new content including information for presenting to end users over a network;
   (b) recording, by the matching engine, the new content in the database if said degree of similarity is determined to be higher than a first upper threshold, or uploading, by an image registering part, the new content if said degree of similarity is determined to be lower than a first lower threshold, or classifying, by a processor programmed to operate as a classifier, the new content into particular categories among a plurality of categories if said degree of similarity is determined to be between the first upper threshold and the first lower threshold, wherein the new content is classified into a first category and a second category, wherein the first category is a category of photos or a category of comics and wherein the second category is a category of color or a category of black-and-white;
   (c) determining, by a filtering part, a degree of harmfulness of the classified new content by extracting text data from the classified new content and by analyzing an image area of a person or an object with a first optimal filter and a second optimal filter associated with said first category and second category respectively, the degree of harmfulness representing a possibility of said classified new content to be determined as a harmful content, wherein the first optimal filter and the second optimal filter are optimal for determining the degree of harmfulness of the classified new content;

(d) recording, by the filtering part, the classified new content in the database recording harmful content items if said degree of harmfulness of said classified new content is determined to be higher than a second upper threshold, or uploading, by the image registering part, the classified new content if said degree of harmfulness of said classified new content is determined to be lower than a second lower threshold, or displaying, by a displaying part, information relating to at least one of the degree of harmfulness, the degree of similarity, and a user who created or distributed the classified new content if said degree of harmfulness of said classified new content is determined to be between the second upper threshold and the second lower threshold; and (e) recording the classified new content in the database or uploading the classified new content in response to user determination based on the displayed information.

12. One or more computer-readable recording media having a computer program executed by one or more processors to perform acts including:

classifying a new content into particular categories among a plurality of categories, the new content including information for presenting to end users over a network, wherein the new content is classified into a first category and a second category, wherein the first category is a category of photos or a category of comics, and wherein the second category is a category of color or a category of black-and-white;

determining a degree of harmfulness of the classified new content by extracting text data from the classified new content and by analyzing an image area of a person or an object with a first optimal filter and a second optimal filter associated with said first category and second category respectively, the degree of harmfulness representing a possibility of said classified new content to be determined as a harmful content, wherein the first optimal filter and the second optimal filter are optimal for determining the degree of harmfulness of the classified new content;

recording the classified new content in a database recording harmful content items if said degree of harmfulness of said classified new content is determined to be higher than a first upper threshold, or uploading the classified new content if said degree of harmfulness of said classified new content is determined to be lower than a first lower threshold, or comparing the classified new content with said harmful content items recorded in the database to calculate a degree of similarity between the content and said harmful content items if said degree of harmfulness of said classified new content is determined to be between the first upper threshold and the first lower threshold;

recording the classified new content in the database if said degree of similarity is determined to be higher than a second upper threshold, or uploading the classified new content if said degree of similarity is determined to be lower than a second lower threshold, or displaying information relating to at least one of: the degree of harmfulness, the degree of similarity and a user who created or distributed the content if said degree of similarity is determined to be between the second upper threshold and the second lower threshold: and recording the classified new content in the database or uploading the classified new content in response to user determination based on the displayed information.

13. A system for blocking newly inputted harmful content, the system comprising:

one or more processors;

one or more computer-readable recording media having a computer program executed by the one or more processors to perform acts comprising:

classifying a new content into particular categories among a plurality of categories, the new content including information for presenting to end users over a network, wherein the new content is classified into a first category and a second category, wherein the first category is a category of photos or a category of comics, and wherein the second category is a category of color or a category of black-and-white;

determining a degree of harmfulness of the classified new content by extracting text data from the classified new content and by analyzing an image area of a person or an object with a first optimal filter and a second optimal filter associated with said first category and second category respectively, the degree of harmfulness representing a possibility of said classified new content to be determined as a harmful content, wherein the first optimal filter and the second optimal filter are optimal for determining the degree of harmfulness of the classified new content;

recording the classified new content in a database recording harmful content items if said degree of harmfulness of said classified new content is determined to be higher than a first upper threshold, or uploading the classified new content if said degree of harmfulness of said classified new content is determined to be lower than a first lower threshold, or comparing the classified new content with said harmful content items recorded in the database to calculate a degree of similarity between the content and said harmful content items if said degree of harmfulness of said classified new content is determined to be between the first upper threshold and the first lower threshold;

recording the classified new content in the database if said degree of similarity is determined to be higher than a second upper threshold, or uploading the classified new content if said degree of similarity is determined to be lower than a second lower threshold, or displaying information relating to at least one of: the degree of harmfulness, the degree of similarity and a user who created or distributed the content if said degree of similarity is determined to be between the second upper threshold and the second lower threshold: and recording the classified new content in the database or uploading the classified new content in response to user determination based on the displayed information.

14. The system of claim 13, wherein correctness of judgment in the degree of harmfulness and the degree of similarity is increased based on information on the harmful content items recorded in the database.

15. The system of claim 13, wherein the new content is classified into category of comics with hatching or category of comics without hatching among said plurality of categories.

16. The system of claim 13, wherein the new content into category of comics with gradation or category of comics without gradation among said plurality of categories.

17. The system of claim 13, wherein a blacklist of users who have created or distributed the harmful content recorded in the database is provided if it is difficult to judge the degree of similarity, and wherein information, on whether a user who created and distributed the content is included in the blacklist, is displayed.

* * * * *